US008208723B2

(12) United States Patent
Yamagishi et al.

(10) Patent No.: US 8,208,723 B2
(45) Date of Patent: Jun. 26, 2012

(54) SMOKE DETECTING APPARATUS

(75) Inventors: Takatoshi Yamagishi, Tokyo (JP); Kazuhisa Nakano, Tokyo (JP); Kenji Terada, Tokyo (JP)

(73) Assignees: Nohmi Bosai Ltd., Tokyo (JP); The University of Tokushima, Tokushima (JP)

( * ) Notice: Subject to any disclaimer, the term of this patent is extended or adjusted under 35 U.S.C. 154(b) by 446 days.

(21) Appl. No.: 12/578,850

(22) Filed: Oct. 14, 2009

(65) Prior Publication Data

US 2010/0098335 A1 Apr. 22, 2010

(30) Foreign Application Priority Data

Oct. 14, 2008 (JP) ................................. 2008-265358
Oct. 16, 2008 (JP) ................................. 2008-267671

(51) Int. Cl.
*G06K 9/00* (2006.01)

(52) U.S. Cl. ......... 382/168; 382/100; 382/218; 382/286

(58) Field of Classification Search .................. 382/100, 382/168, 218, 286; 356/438; 348/143, 165, 348/154; 340/577, 578, 630
See application file for complete search history.

(56) References Cited

U.S. PATENT DOCUMENTS 6,956,485 B1 10/2005 Aird et al. ..................... 340/577
7,245,315 B2 * 7/2007 Sadok et al. .................. 348/165
7,256,818 B2 * 8/2007 Sadok et al. .................. 348/143
7,280,696 B2 * 10/2007 Zakrzewski et al. .......... 382/218
7,505,604 B2 * 3/2009 Zakrzewski et al. .......... 382/100
7,729,510 B2 * 6/2010 Zakrzewski et al. .......... 382/100
2003/0215141 A1 11/2003 Zakrzewski et al. .......... 382/218
2004/0080618 A1 4/2004 Norris et al. ............... 348/207.1
2006/0115154 A1 6/2006 Chen ............................. 382/181
2007/0188336 A1 8/2007 Privalov ........................ 382/103

FOREIGN PATENT DOCUMENTS

FR 2 696 939 4/1994
JP 5-20558 1/1993
JP 2004-236088 8/2004
JP 2007-272532 10/2007
JP 2008-46917 2/2008

(Continued)

OTHER PUBLICATIONS

European Search Report (in English language) issued May 17, 2010 in corresponding European Patent Application No. 09 25 2403.

(Continued)

*Primary Examiner* — Anh Hong Do

(74) *Attorney, Agent, or Firm* — Wenderoth, Lind & Ponack, LLP

(57) ABSTRACT

Provided is a smoke detecting apparatus capable of detecting occurrence of smoke at high sensitivity while suppressing an effect of disturbance. The smoke detecting apparatus for detecting occurrence of smoke by subjecting an image captured by a monitoring camera to image processing includes: an image memory (10) for storing a plurality of images captured by the monitoring camera in a time series; and a smoke detection area selecting portion (20) for calculating a luminance histogram of the same pixel for each predetermined pixel a plurality of times in a past predetermined period based on the plurality of images stored in the image memory (10), detecting presence or absence of a luminance value that has been newly generated due to occurrence of one of an intrusive object and smoke based on the luminance histogram, and identifying candidate regions to be subjected to the image processing.

9 Claims, 9 Drawing Sheets

FOREIGN PATENT DOCUMENTS

| | | |
|---|---|---|
| JP | 2008-236029 | 10/2008 |
| WO | 01/24131 | 4/2001 |
| WO | 02/41273 | 5/2002 |

OTHER PUBLICATIONS

Partial European Search Report (in English language) issued Jan. 22, 2010 in corresponding European Patent Application No. 09 25 2403.

* cited by examiner

IDENTIFIED CANDIDATE REGIONS

MAPPING RESULT OF REGIONS HAVING
HIGH PROBABILITY OF SMOKE OCCURRENCE

H : HIGH
M : MEDIUM
L : LOW

| | | | | |
|---|---|---|---|---|
| M | M | M | M | M |
| M | M | M | M | M |
| M | M | M | M | M |
| M | M | M | M | M |

| | | | | |
|---|---|---|---|---|
| M | M | M | M | M |
| M | H | M | M | M |
| M | H | M | L | L |
| M | M | M | L | L |

SMOKE DETECTING APPARATUS

BACKGROUND OF THE INVENTION

1. Field of the Invention

The present invention relates to a smoke detecting apparatus for detecting occurrence of smoke by subjecting an image captured by a monitoring camera to image processing, and more particularly, to a smoke detecting apparatus capable of avoiding false detection and detection failure due to an effect of disturbance.

2. Description of the Related Art

Early detection of fire or smoke is very important in view of early fire control upon occurrence of a fire, and in view of preventing trapping in a fire accident. Therefore, in the field of smoke detecting apparatuses, studies have been conducted for early smoke detection by subjecting an image captured by a monitoring camera to image processing.

As an example, there has been known a smoke detecting apparatus for detecting smoke by installing a camera in a tunnel or the like and subjecting an image captured by the camera to image processing. In the image processing for detecting smoke, generally, an image to be used as reference (reference image) is previously stored, a differential image between a most recently captured image and the reference image is calculated, and a region in which a change has occurred is extracted, to thereby detect smoke (see, for example, JP 3909665 B).

Further, in order to adapt to a temporal change of the reference image due to an effect of sunshine or the like, the reference image is periodically updated.

By detecting smoke by subjecting an image captured by a camera to image processing, the following two advantages may be obtained.

1) By visually checking the image of the monitoring camera, smoke detection status may be grasped at a remote site.

2) It is possible to use a monitoring camera that is already installed, resulting in an efficient use of facility.

However, the related art has the following problems.

Conventionally, in order to detect smoke, a pixel region having a luminance difference from a frame differential image or background image above a predetermined threshold has been extracted. However, there has been a problem in that, for example, when the captured image changes due to an effect of a change in surrounding illumination condition or the like, a portion with no occurrence of smoke may be falsely detected as smoke.

In addition, the smoke itself as a detection target is pale and may have a small luminance change (luminance difference) in the captured image depending on the background color. Therefore, simply determining the differential image alone may not allow smoke detection at high sensitivity because the threshold setting for the luminance difference is difficult.

Further, the image is preferably captured by the monitoring camera in an environment where the illumination condition and a field of view are always stable. However, the location to be monitored may not always have such good conditions. Moving objects such as people may come and go in a monitoring range in one location, or the sunshine condition may change with time in another location, to thereby render a partial area of the monitoring range unsuitable for monitoring.

According to the related art, the smoke detection is performed with the same judgment criterion even for the area unsuitable for monitoring, and the effect due to intrusion of the moving object or the change in sunshine condition (effect of disturbance) may be falsely detected as the smoke occurrence. It is also possible to divide the image into a matrix of regions of a predetermined size and mask the area (region) unsuitable for monitoring to be excluded from the smoke detection, but the masking results in limiting the range that may be monitored.

SUMMARY OF THE INVENTION

The present invention has been made to solve the above-mentioned problems, and an object of the present invention is therefore to provide a smoke detecting apparatus capable of detecting smoke at high sensitivity while suppressing the effect of disturbance.

Another object of the present invention is to provide a smoke detecting apparatus which avoids false detection due to the effect of disturbance without limiting the range that may be monitored.

The present invention provides a smoke detecting apparatus for detecting occurrence of smoke by subjecting an image captured by a monitoring camera to image processing, the smoke detecting apparatus including: an image memory for storing a plurality of images captured by the monitoring camera in a time series; and a smoke detection area selecting portion for calculating a luminance histogram of the same pixel for each predetermined pixel a plurality of times in a past predetermined period based on the plurality of images stored in the image memory, detecting presence or absence of a luminance value that has been newly generated due to occurrence of one of an intrusive object and smoke based on the luminance histogram, and identifying candidate regions (candidate areas) to be subjected to the image processing.

The present invention also provides a smoke detecting apparatus including: smoke feature value calculating means for extracting a feature value regarding smoke for each of a plurality of regions set in an image captured by a monitoring camera; a storage portion storing a plurality of predetermined reference judgment values having a plurality of detection sensitivities for the each of the plurality of regions, for judging presence or absence of smoke occurrence for the each of the plurality of regions; region-to-region sensitivity setting means for setting a desired detection sensitivity for the each of the plurality of regions depending on an object to be monitored by the monitoring camera; and smoke judging means for retrieving a predetermined reference judgment value corresponding to the desired detection sensitivity set by the region-to-region sensitivity setting means from among the plurality of predetermined reference judgment values stored in the storage portion, comparing the retrieved predetermined reference judgment value with the feature value extracted by the smoke feature value calculating means, and detecting smoke occurrence at the desired detection sensitivity for the each of the plurality of regions based on a result of the comparison, for the each of the plurality of regions.

According to the present invention, there may be obtained the smoke detecting apparatus capable of detecting smoke at high sensitivity while suppressing the effect of disturbance, by calculating the luminance histogram for the each predetermined pixel in the past predetermined period based on the plurality of images captured in a time series, detecting the presence or absence of the newly generated luminance value based on the calculated luminance histogram, and identifying the smoke detection area.

Further, according to the present invention, there may also be obtained the smoke detecting apparatus which avoids false detection due to the effect of disturbance without limiting the range that may be monitored, by performing smoke detection using a reference judgment value having a desired detection sensitivity for each region depending on the object to be monitored.

DETAILED DESCRIPTION OF THE PREFERRED EMBODIMENTS

Hereinafter, preferred embodiments of a smoke detecting apparatus according to the present invention are described with reference to the drawings.

First Embodiment

Figure 1:
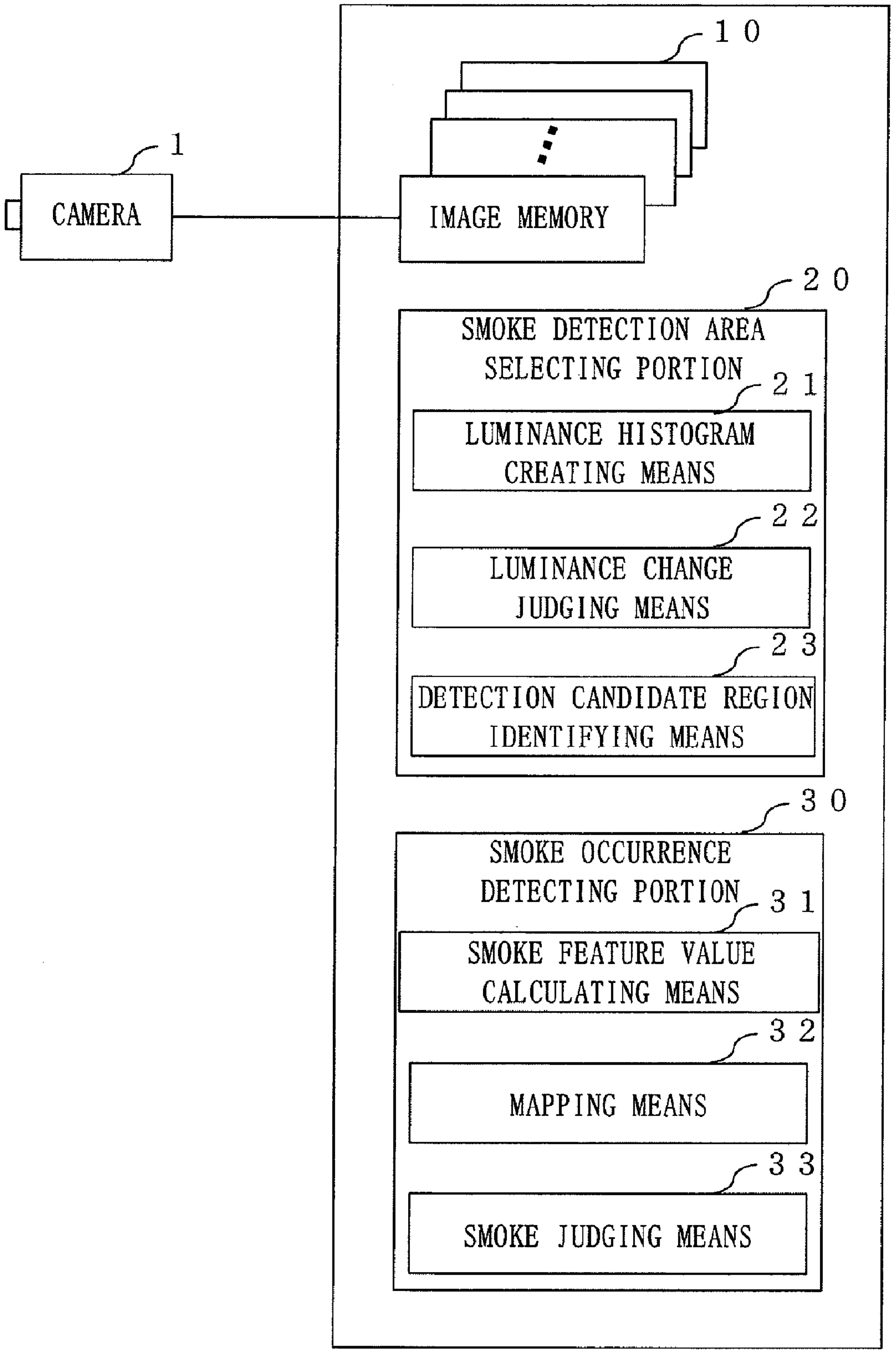
FIG. 1 is a configuration diagram of a smoke detecting apparatus according to a first embodiment of the present invention.

FIG. 1 is a configuration diagram of a smoke detecting apparatus according to a first embodiment of the present invention. The smoke detecting apparatus according to the first embodiment of the present invention includes an image memory 10, a smoke detection area selecting portion 20, and a smoke occurrence detecting portion 30. The image memory 10 is configured as an image memory for a plurality of frames so that images captured by a camera 1 may be stored over a past predetermined period as time-series data.

The smoke detection area selecting portion 20 includes luminance histogram creating means 21, luminance change judging means 22, and detection candidate region identifying means 23. The smoke detection area selecting portion 20 has a function of identifying areas to be subjected to smoke detection as smoke detection candidate regions based on the images captured by the camera 1 and stored in the image memory 10 over the past predetermined period.

The smoke occurrence detecting portion 30 includes smoke feature value calculating means 31, mapping means 32, and smoke judging means 33. The smoke occurrence detecting portion 30 has a function of calculating a feature value for detecting smoke occurrence for the smoke detection candidate regions identified by the smoke detection area selecting portion 20, and judging whether or not smoke has occurred based on a result of the calculation. The feature value of smoke is calculated based on, for example, a characteristic that when smoke enters a region, luminance of the region is reduced and luminance of the entire region converges to a predetermined luminance value, or a characteristic that a change in average luminance does not have regularity as opposed to an artificial light source.

With this configuration, the smoke detecting apparatus according to the first embodiment of the present invention may realize effective smoke detection at high sensitivity by subjecting the identified smoke detection candidate regions to image processing for detecting presence or absence of smoke.

The present invention has a feature that, instead of subjecting an entire captured image to smoke detection, only the smoke detection candidate regions of the captured image, which are divided regions obtained by dividing the image into a plurality of blocks, are subjected to the smoke detection. Specifically, the present invention has a technical feature of having the function of the smoke detection area selecting portion 20. Accordingly, the function of the smoke detection area selecting portion 20 is described first.

Step 1: Function of Luminance Histogram Creating Means 21

The luminance histogram creating means 21 judges whether or not a change such as an intrusive object or smoke has occurred in the captured image by calculating a luminance histogram in a past predetermined period for each predetermined pixel.

The intrusive object herein refers to a passerby or the like temporarily passing through the image. The luminance histogram refers to a frequency distribution indicating how luminance values of the target pixel have been distributed in the time-series data in the past predetermined period.

Figure 2A:
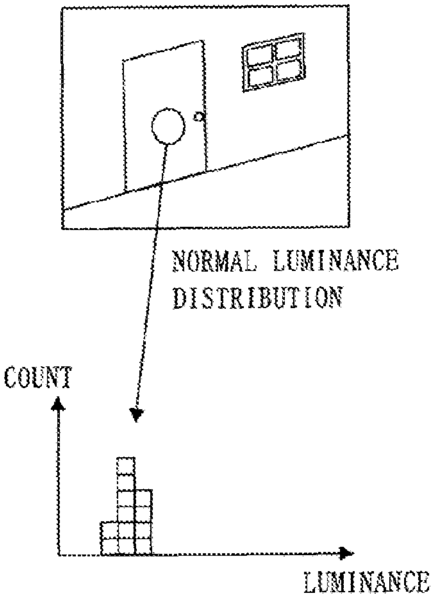
FIGS. 2A and 2B are diagrams each illustrating as an example a luminance histogram created by luminance histogram creating means according to the first embodiment of the present invention.
Figure 2B:
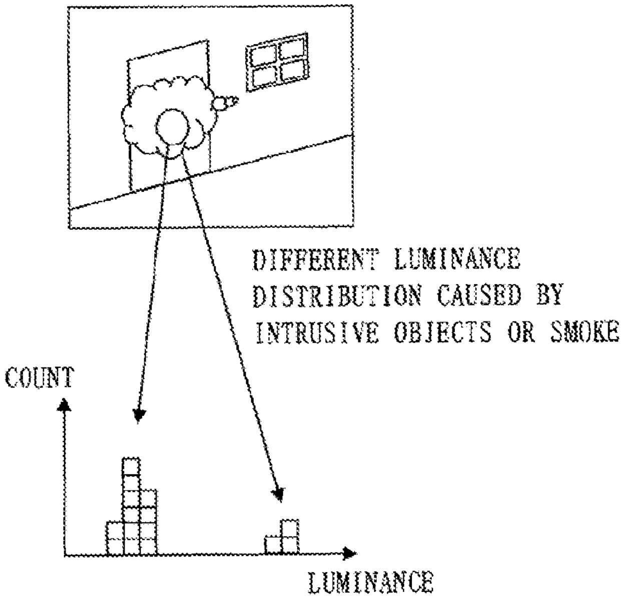

FIGS. 2A and 2B are diagrams each illustrating as an example the luminance histogram created by the luminance histogram creating means 21 according to the first embodiment of the present invention. Assuming a state where no intrusive object occurs and no smoke occurs, when frequencies of luminance values of a pixel are added up across a plurality of images in the past predetermined period, no change occurs in the predetermined period. Therefore, the distribution of the luminance values is concentrated in a narrow luminance range as illustrated in FIG. 2A, with a result that the frequencies in the narrow range are high. The frequency herein refers to the "count" on the ordinate of FIGS. 2A and 2B. In other words, with the maximum value being the number of images captured in the predetermined period, the frequency refers to the number of times a predetermined pixel with the same positional coordinates in the images has taken the same luminance value. The histogram is a distribution indicating which luminance values each pixel has had in the past. Therefore, in a state where there is no intrusive object, the luminance values of the pixel are distributed in a narrow range and the counts remain high.

On the other hand, assuming a state where an intrusive object occurs or smoke occurs, when frequencies of luminance values of a pixel are added up across a plurality of images in the past predetermined period, a change occurs in the images for a predetermined period due to the intrusive object or the like. Therefore, luminance values having a different distribution than before start to appear in a range other than the narrow luminance range illustrated in FIG. 2A, but the counts of the newly appeared luminance values are of course low. That is, luminance values detected in a different distribution than the high and narrow luminance distribution are obtained from images after the intrusive object occurrence or the smoke occurrence.

When the number of images after the intrusive object or smoke occurrence is smaller than the number of images before the occurrence among the plurality of images in the past predetermined period, the frequencies of the newly appeared luminance values having the different distribution are lower than the frequencies of the luminance values in the narrow range before the occurrence as illustrated in FIG. 2A.

Further, even when a luminance difference between the luminance distribution before the occurrence and the luminance distribution after the occurrence is small, determining a histogram for each pixel based on a plurality of images in the past predetermined period allows the intrusive object occurrence or the smoke occurrence to be discriminated with high accuracy.

Further, the luminance histogram creating means 21 counts the obtained luminance values in groups to create the luminance histogram (for example, a luminance value of 100 is counted in a group of three luminance values (luminance values of 99, 100, and 101) along with a previous luminance value of 99 and a subsequent luminance value of 101). This may reduce the number of operations for calculating the histogram, and a result with less effect of noise may be obtained. Alternatively, the result with less effect of noise may be obtained also by obtaining a luminance histogram and then subjecting the luminance histogram to smoothing. Note that in creating the luminance histogram, the histogram may be created for each pixel, but the histogram may also be shared by adjacent pixels. For example, the luminance histogram may be created in groups of 2×2 (4 in total) pixels or in groups of 3×3 (9 in total) pixels, and processing time for the operations may be reduced as the number of pixels in each group increases. Preferably, grouping four pixels may reduce the processing time without decreasing the accuracy of detecting an intrusive object.

Step 2: Function of Luminance Change Judging Means 22

The luminance change judging means 22 detects presence or absence of a luminance value that has been newly generated by intrusive object or smoke occurrence based on the luminance histogram that has been individually calculated (generated) for each predetermined pixel by the luminance histogram creating means 21. For example, when a predetermined number of pixels having luminance values of lower frequency with respect to a luminance distribution (before occurrence) occur as illustrated in FIG. 2B, the luminance change judging means 22 may judge that a probability of intrusive object or smoke occurrence is high in the part of the pixels.

The luminance change judging means 22 makes the above-mentioned judgment independently for each predetermined pixel and outputs the result as a map corresponding to a frame. For example, when a frame includes p×q pixels (where p and q are integers equal to or larger than 2), the luminance change judging means 22 maps or binarizes each of the p×q pixels by setting pixels having a high probability of intrusive object or smoke occurrence to "1" and other pixels to "0", to thereby obtain a mapping image (binary image). Note that if a luminance value of a target pixel of a current image has a count smaller than a predetermined count when compared to the obtained histogram, the pixel may be judged to correspond to an intrusive object.

Step 3: Function of Detection Candidate Region Identifying Means 23

The data of one frame mapped by the luminance change judging means 22 is previously divided into a plurality of predetermined areas. The detection candidate region identifying means 23 judges whether or not a ratio of pixels of "1" is equal to or higher than a predetermined value for each of the previously divided areas on which "1"s and "0"s are mapped.

Figure 3A:
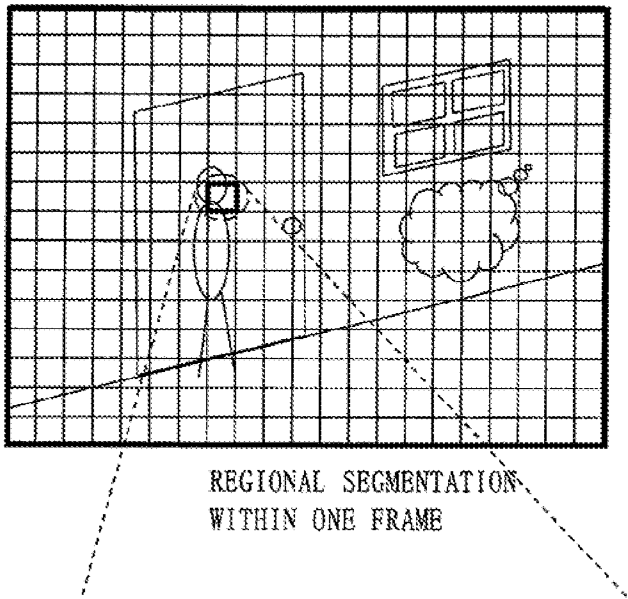
FIGS. 3A and 3B are explanatory diagrams illustrating relationship between regional segmentation (area segmentation) within one frame (screen) and a mapping result within one region according to the first embodiment of the present invention.
Figure 3B:
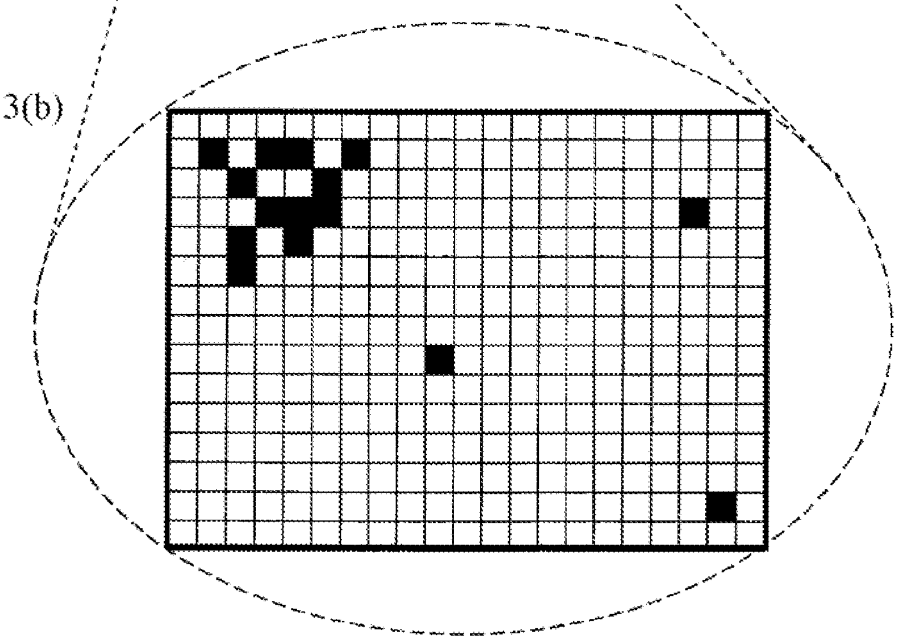

FIGS. 3A and 3B are explanatory diagrams illustrating relationship between regional segmentation within one frame and a mapping result within one region according to the first embodiment of the present invention. FIG. 3A illustrates a plurality of divided regions previously set in one frame. As illustrated in FIG. 3A, the frame is divided into a plurality of rectangular regions forming a matrix of rows and columns. There is a person as an intrusive object in front of a door, and there is smoke as an intrusive object below a window on the right. FIG. 3B illustrates a state where each region is divided into pixels and the pixels are mapped by the luminance change judging means 22. Accordingly, each region includes a plurality of pixels.

In FIG. 3B, portions of solid black pixels indicate pixels mapped to "1" as pixels having a high probability of intrusive object or smoke occurrence. Therefore, the detection candidate region identifying means 23 judges whether or not a ratio of pixels of "1" (that is, solid black pixels) is equal to or higher than a predetermined value for each of the divided regions based on a result of mapping as illustrated in FIG. 3B.

Subsequently, the detection candidate region identifying means 23 identifies regions having the ratio of the pixels of "1" equal to or higher than the predetermined value with respect to a size of one region as candidate regions to be subjected to detailed smoke detection. On the other hand, the detection candidate region identifying means 23 identifies regions having the ratio of the pixels of "1" lower than the predetermined value as regions not to be subjected to the smoke detection in the subsequent stage. Alternatively, the detection candidate region identifying means 23 identifies regions having a ratio of pixels of "0" equal to or higher than a predetermined value as the regions not to be subjected to the smoke detection in the subsequent stage.

Figure 4:
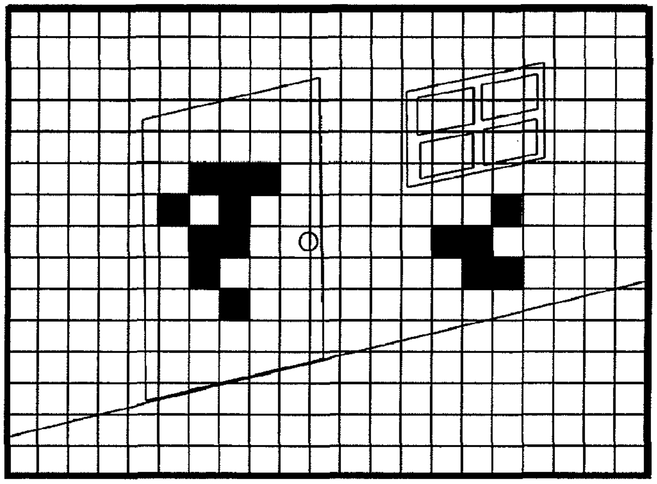
FIG. 4 is a diagram illustrating candidate regions identified by a smoke detection area selecting portion according to the first embodiment of the present invention.

FIG. 4 is a diagram illustrating candidate regions identified by the smoke detection area selecting portion 20 according to the first embodiment of the present invention. In FIG. 4, solid black portions are regions selected by the smoke detection area selecting portion 20, which are regions having a high ratio of the above-mentioned pixels of "1". FIG. 4 corresponds to the state of FIG. 3A where there are intrusive objects, and includes a plurality of solid black regions as candidate regions in front of the door and below the window. The image includes a plurality of regions, but calculations may be performed only on the candidate regions in image processing for judging whether or not smoke has occurred in each of the regions, which results in reduction of the total amount of operations. This series of processing steps allows the smoke detection area selecting portion 20 to identify with high accuracy the candidate regions to be subjected to the detailed smoke detection in the smoke occurrence detecting portion 30 in the subsequent stage, from among the plurality of previously divided areas, based on a result of calculating the luminance histogram over the past predetermined period. Consequently, the smoke detection may be performed at high sensitivity while suppressing the effect of disturbance. Specifically, when smoke or the like occurs in a region, most pixels in the region generate a different distribution in the histogram to be set to “1”. Therefore, the region has a high ratio of pixels set to “1” and hence is extracted as a candidate region. A temporary change of illumination or the like, however, is not likely to generate a different distribution in the luminance histogram. Therefore, the region with the effect of disturbance has a small number of pixels set to “1” and hence is not likely to be regarded as a candidate region.

Next, the function of the smoke occurrence detecting portion 30 is described. The smoke occurrence detecting portion 30 may judge presence or absence of smoke occurrence by extracting a feature value regarding smoke for candidate regions to be subjected to detailed smoke detection identified by the smoke detection area selecting portion 20.

Step 1: Function of Smoke Feature Value Calculating Means 31

Representative extraction methods for the feature value include the following four methods. By applying the following methods to each of the candidate regions to be subjected to the detailed smoke detection to determine the feature value, the smoke feature value calculating means 31 may judge whether or not the region has a high probability of smoke occurrence. Note that the following approaches for calculating the smoke feature value are particularly suited to detect smoke that flows relatively slowly.

[Extraction Method 1: Smoke Detection Based on Luminance Distribution of Pixels]

The smoke feature value calculating means 31 calculates a luminance distribution of pixels in each region, for each of the candidate regions to be subjected to detailed smoke detection identified by the smoke detection area selecting portion 20. In calculating the luminance distribution, the smoke feature value calculating means 31 does not necessarily need to use all pixels in the region. The smoke feature value calculating means 31 may calculate the luminance distribution only for pixels mapped to “1” by the luminance change judging means 22 as pixels having a high probability of intrusive object or smoke occurrence.

Further, the smoke feature value calculating means 31 basically uses the most recently captured image to calculate the luminance distribution. However, the smoke feature value calculating means 31 may also use a plurality of images captured in the past.

Then, the smoke feature value calculating means 31 judges whether or not the calculated luminance distribution or a standard deviation obtained from the luminance distribution falls within a predetermined range, and may judge that a probability of smoke occurrence is high when the luminance distribution or the standard deviation falls within the predetermined range.

[Extraction Method 2: Smoke Detection Based on Temporal Distribution of Average Luminance Values of Pixels]

The smoke feature value calculating means 31 calculates average luminance values of pixels in each region, for each of the candidate regions to be subjected to detailed smoke detection identified by the smoke detection area selecting portion 20. In calculating the average luminance values, the smoke feature value calculating means 31 does not necessarily need to use all pixels in the region. The smoke feature value calculating means 31 may calculate the average luminance values only for pixels mapped to “1” by the luminance change judging means 22 as pixels having a high probability of intrusive object or smoke occurrence.

Subsequently, the smoke feature value calculating means 31 calculates average luminance values of the same region in a plurality of captured images over a past predetermined period, and generates time-series data of the average luminance values for each target region. Then, the smoke feature value calculating means 31 calculates a luminance distribution of the generated time-series data of the average luminance values.

Then, the smoke feature value calculating means 31 judges whether or not the luminance distribution calculated based on the time-series data of the average luminance values or a standard deviation obtained from the luminance distribution falls within a predetermined range, and may judge that a probability of smoke occurrence is high when the luminance distribution or the standard deviation falls within the predetermined range.

[Extraction Method 3: Smoke Detection Based on Low-Frequency Intensity of Average Luminance Values of Pixels]

The smoke feature value calculating means 31 generates time-series data of average luminance values for each target region similarly to the extraction method 2 described above. Then, the smoke feature value calculating means 31 Fourier-transforms the generated time-series data of the average luminance values to calculate a power spectrum.

Subsequently, the smoke feature value calculating means 31 extracts predetermined low-frequency components from the power spectrum calculated based on the time-series data of the average luminance values, calculates an intensity corresponding to a mode of the predetermined low-frequency components, and may judge that a probability of smoke occurrence is high when the intensity is equal to or lower than a predetermined value.

[Extraction Method 4: Smoke Detection Based on Average Difference from Reference Image]

The smoke feature value calculating means 31 determines a luminance difference value between each pixel in each candidate region and a corresponding pixel in a reference image previously stored in the image memory 10 for each candidate region to be subjected to detailed smoke detection identified by the smoke detection area selecting portion 20. Further, the smoke feature value calculating means 31 determines an average value of the luminance difference values for each candidate region, and may judge that a probability of smoke occurrence is high when the average value is higher than a predetermined value or falls within a predetermined range.

Step 2: Function of Mapping Means 32

The mapping means 32 maps each candidate region to be subjected to detailed smoke detection based on results of extraction by the smoke feature value calculating means 31 using the four extraction methods 1 to 4. For example, the mapping means 32 may set regions judged to have a high probability of smoke occurrence by at least one of the four extraction methods 1 to 4 to “1” and other regions to “0”.

As another mapping method, the mapping means 32 may set regions judged to have a high probability of smoke occurrence by a plurality of (at least two) extraction methods to “1” and other regions to “0”. Alternatively, the mapping means 32 may set regions judged to have a high probability of smoke occurrence in common by a certain combination of the four extraction methods 1 to 4 to “1” and other regions to “0”.

Figure 5:
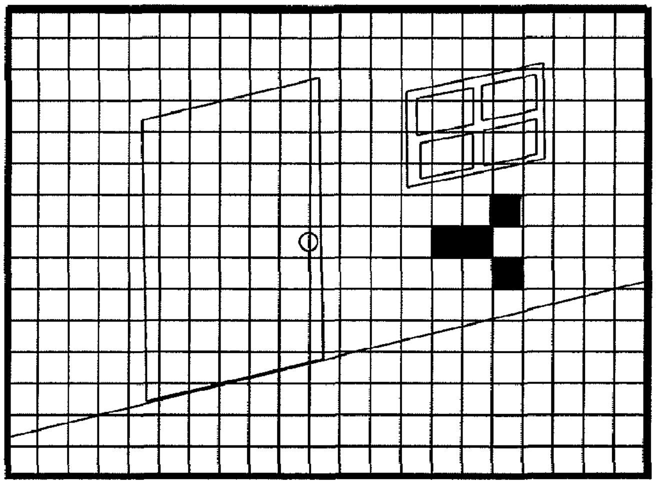
FIG. 5 is a diagram illustrating a mapping result output by mapping means according to the first embodiment of the present invention.

FIG. 5 is a diagram illustrating a mapping result output by the mapping means 32 according to the first embodiment of the present invention. By calculating a feature value regarding smoke for the candidate regions illustrated in FIG. 4 described above, it is possible to sort out regions having a high probability of smoke occurrence from among the candidate regions as illustrated in FIG. 5. FIG. 5 illustrates a case where the candidate regions at the door (see FIG. 4), which are extracted due to the presence of an intrusive object such as a passerby passing through the image, are judged to have a low probability of smoke occurrence. Moreover, FIG. 5 illustrates a case where four regions out of the five candidate regions below the window (see FIG. 4) are judged to have a high probability of smoke occurrence.

Step 3: Function of Smoke Judging Means 33

Based on data of each region of one frame mapped by the mapping means 32, the smoke judging means 33 judges whether or not (candidate) regions mapped to "1" are detected across a predetermined number of regions over a predetermined continuous period of time. For example, the smoke judging means 33 may finally judge that smoke has occurred when n or more regions (where n is an integer equal to or greater than 2) in a row or column direction are mapped by the mapping means 32 to "1" and the connected regions are detected m or more consecutive times (where m is an integer equal to or greater than 2) in time-series frames sequentially acquired from the past to present.

Figure 6:
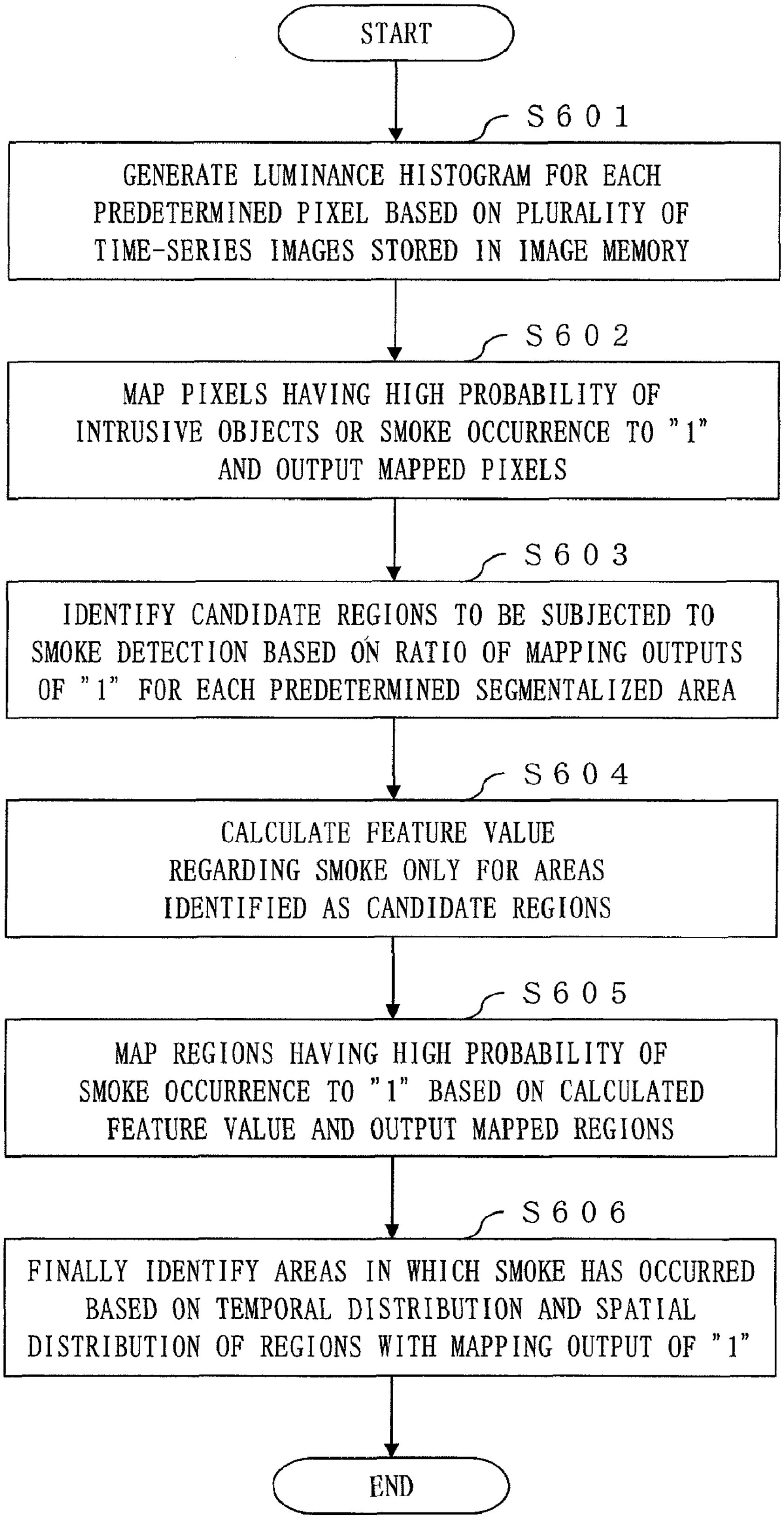
FIG. 6 is a flow chart illustrating a flow of overall processing performed by the smoke detecting apparatus according to the first embodiment of the present invention.

Next, a flow of overall processing performed by the smoke detecting apparatus according to the present invention having the configuration of FIG. 1 is described with reference to a flow chart. FIG. 6 is the flow chart illustrating the flow of overall processing performed by the smoke detecting apparatus according to the first embodiment of the present invention.

First, in Step S601, the luminance histogram creating means 21 generates a luminance histogram for each predetermined pixel based on data of a plurality of time-series images stored in the image memory 10 (see FIGS. 2A and 2B). Next, in Step S602, the luminance change judging means 22 detects presence or absence of a luminance value that has been newly generated due to intrusive object or smoke occurrence based on the generated luminance histogram. Then, the luminance change judging means 22 maps pixels having a high probability of the intrusive object or smoke occurrence, and outputs the mapped pixels (see FIG. 3B).

Then, in Step S603, the detection candidate region identifying means 23 judges whether or not a ratio of the pixels mapped to have the high probability of the intrusive object or smoke occurrence is equal to or higher than a predetermined value for each of the previously divided areas, and identifies candidate regions to be subjected to smoke detection (see FIG. 4).

Steps S601 to S603 described above is a series of processing steps performed by the smoke detection area selecting portion 20. This way, smoke detection processing to be performed by the smoke occurrence detecting portion 30 in Step S604 and subsequent steps is performed only on the candidate regions to be subjected to smoke detection identified by the smoke detection area selecting portion 20. Therefore, the amount of operations may be reduced compared to a case where the entire image is processed.

In Step S604, the smoke feature value calculating means 31 calculates the feature value regarding smoke using the extraction methods 1 to 4 described above only for areas identified as the candidate regions to be subjected to smoke detection. Then, in Step S605, the mapping means 32 maps regions having a high probability of smoke occurrence and outputs the mapped regions (see FIG. 5).

Next, in Step S606, the smoke judging means 33 finally identifies areas in which smoke has occurred based on a temporal distribution and a spatial distribution of a result of mapping the divided areas by the mapping means 32.

By performing the series of processing steps described above, the smoke occurrence detecting portion 30 may judge presence or absence of smoke occurrence by extracting the feature value regarding smoke only for the candidate regions to be subjected to detailed smoke detection identified by the smoke detection area selecting portion 20 based on the calculation result of the luminance histogram over the past predetermined period. Consequently, the smoke detecting apparatus according to the first embodiment of the present invention may detect smoke at high sensitivity while suppressing the effect of disturbance.

As described above, the smoke detecting apparatus according to the first embodiment of the present invention has a configuration of calculating the luminance histogram in the past predetermined period for each predetermined pixel from a plurality of images captured in a time series. As a result, there may be obtained a smoke detecting apparatus capable of easily detecting presence or absence of a luminance value that has been newly generated due to occurrence of an intrusive object or smoke and of detecting smoke at high sensitivity while suppressing the effect of disturbance.

In particular, even when a luminance difference between a luminance distribution before the occurrence and a luminance distribution after the occurrence is small, the luminance histogram is determined for each pixel based on the plurality of images in the past predetermined period, and hence the presence of the newly generated luminance value may be discriminated with high accuracy.

In addition, by performing the smoke detection only on the candidate regions in which the presence of the newly generated luminance value has been detected, there may be realized highly accurate smoke detection while avoiding false detection while reducing computational load.

Further, by determining a plurality of feature values as the feature value for smoke detection, it may be judged whether or not the candidate region has a high probability of smoke occurrence with respect to a predetermined combination of respective judgment results based on the plurality of feature values, to thereby improve the detection accuracy. Moreover, in calculating the feature value regarding smoke, the extraction methods 1 to 3 described above do not need to previously store the reference image as opposed to the extraction method 4. Therefore, when the feature value is determined without using the extraction method 4, another merit may be obtained in that the reference image is not required.

By utilizing a characteristic that smoke spreads over a predetermined region, the smoke detecting apparatus according to the first embodiment of the present invention also includes the smoke judging means for judging that smoke has occurred when the regions mapped to have a high probability of smoke occurrence are detected across a predetermined number of regions over a predetermined continuous period of time. Consequently, there may be realized stable and highly accurate smoke detection while avoiding false detection.

As described above, the smoke detecting apparatus according to the first embodiment of the present invention is configured to calculate the luminance histogram from the plurality of images in the past and detects luminance values of low frequency as an intrusive object. Therefore, regions corresponding to smoke with a small luminance difference may be extracted at high sensitivity, and effects of illumination change and the like may be absorbed. Further, calculating a histogram for each pixel requires enormous amounts of storage space and calculation, and hence the smoke detecting apparatus according to the first embodiment of the present invention reduces the amount of calculation by sharing the histogram with adjacent pixels.

Hereinafter, a smoke detecting apparatus according to a second embodiment of the present invention is described with reference to the drawings.

Note that like parts to the first embodiment are represented by like numerals and description thereof is omitted.

Second Embodiment

Figure 7:
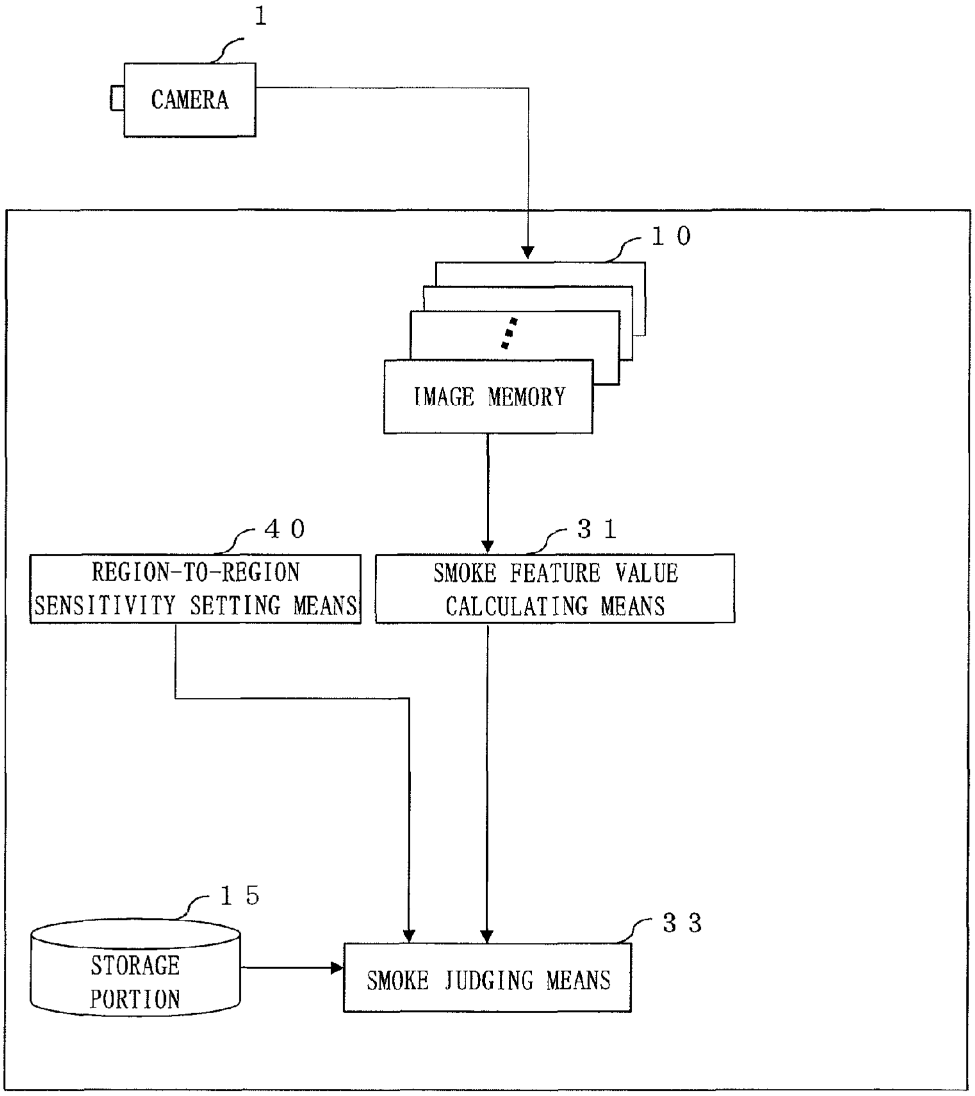
FIG. 7 is a configuration diagram illustrating a smoke detecting apparatus according to a second embodiment of the present invention.

FIG. 7 is a configuration diagram of the smoke detecting apparatus according to the second embodiment of the present invention. The smoke detecting apparatus according to the second embodiment of the present invention includes an image memory 10, a storage portion 15, smoke feature value calculating means 31, region-to-region sensitivity setting means 40, and smoke judging means 33. The image memory 10 is configured as an image memory for a plurality of frames so that images captured by a camera 1 may be stored over a past predetermined period as time-series data.

Figures 8, 9A, 9B:
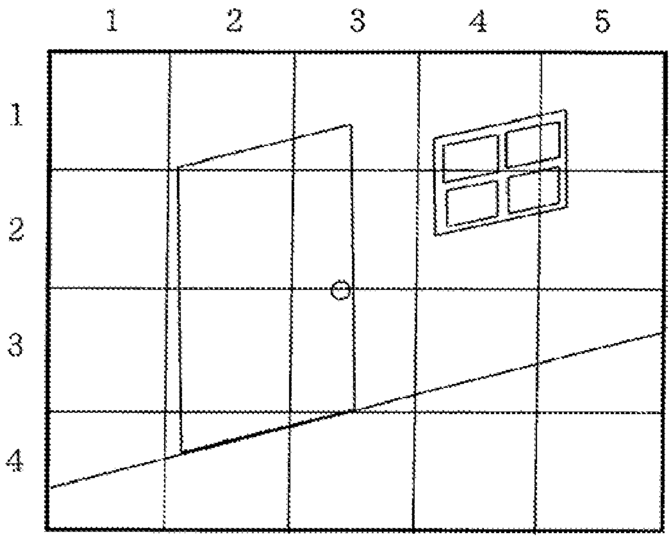
FIG. 8 is an explanatory diagram of a regional segmentation of an image to be monitored according to the second embodiment of the present invention.
FIGS. 9A and 9B are exemplary diagrams of desired detection sensitivities set for respective regions of the image to be monitored according to the second embodiment of the present invention.

The image to be monitored is previously divided into a plurality of predetermined regions to set the plurality of regions in the image. FIG. 8 is an explanatory diagram of a regional segmentation of the image to be monitored according to the second embodiment of the present invention. FIG. 8 illustrates a case where the image to be monitored is previously divided into 20 regions to form a matrix of 4 rows and 5 columns. In the storage portion 15, a plurality of values having different detection sensitivities are previously stored as reference judgment values for judging presence or absence of smoke occurrence for each of the plurality of regions.

In order to simplify the description, the following description exemplifies a case where the detection sensitivities include three levels of high, medium, and low. When the detection sensitivities include the three levels, the storage portion 15 stores three different reference judgment values corresponding to the levels of high, medium, and low for each region.

The smoke feature value calculating means 31 extracts a feature value regarding smoke for each region from the captured images stored in the image memory 10, and judges whether or not the region has a high probability of smoke occurrence. Representative extraction methods for the feature value include the following four methods described above.

[Extraction Method 1: Smoke Detection Based on Luminance Distribution of Pixels]

The smoke feature value calculating means 31 calculates a luminance distribution of pixels in each region for each region. The smoke feature value calculating means 31 basically uses the most recently captured image to calculate the luminance distribution. However, the smoke feature value calculating means 31 may also use a plurality of images captured in the past with the use of time-series data of the plurality of images stored in the image memory 10. This way, the smoke feature value calculating means 31 outputs as the feature value regarding smoke the calculated luminance distribution or a standard deviation obtained from the luminance distribution.

Subsequently, the smoke judging means 33 to be described below judges whether or not the luminance distribution calculated by the smoke feature value calculating means 31 or the standard deviation obtained from the luminance distribution falls within a predetermined range. Then, the smoke judging means 33 may judge that a probability of smoke occurrence is high when the luminance distribution or the standard deviation falls within the predetermined range.

[Extraction Method 2: Smoke Detection Based on Temporal Distribution of Average Luminance Values of Pixels]

The smoke feature value calculating means 31 calculates average luminance values of pixels in each region for each region. Then, the smoke feature value calculating means 31 calculates average luminance values of the same region in a plurality of captured images over a past predetermined period with the use of time-series data of the plurality of images stored in the image memory 10, and generates time-series data of the average luminance values for each target region. Thereafter, the smoke feature value calculating means 31 calculates a luminance distribution of the generated time-series data of the average luminance values.

This way, the smoke feature value calculating means 31 outputs the luminance distribution calculated based on the time-series data of the average luminance values or a standard deviation obtained from the luminance distribution as the feature value regarding smoke.

Subsequently, the smoke judging means 33 to be described below judges whether or not the luminance distribution calculated by the smoke feature value calculating means 31 or the standard deviation obtained from the luminance distribution falls within a predetermined range, and may judge that a probability of smoke occurrence is high when the luminance distribution or the standard deviation falls within the predetermined range.

[Extraction Method 3: Smoke Detection Based on Low-Frequency Intensity of Average Luminance Values of Pixels]

The smoke feature value calculating means 31 generates time-series data of average luminance values for each target region similarly to the extraction method 2 described above. Then, the smoke feature value calculating means 31 Fourier-transforms the generated time-series data of the average luminance values to calculate a power spectrum.

Subsequently, the smoke feature value calculating means 31 extracts predetermined low-frequency components from the power spectrum calculated based on the time-series data of the average luminance values and calculates an intensity corresponding to a mode of the predetermined low-frequency components. This way, the smoke feature value calculating means 31 outputs as the feature value regarding smoke the intensity of the low-frequency components calculated based on the time-series data of the average luminance values.

Subsequently, the smoke judging means 33 to be described below may judge that a probability of smoke occurrence is high when the intensity calculated by the smoke feature value calculating means 31 is equal to or lower than a predetermined value.

[Extraction Method 4: Smoke Detection Based on Average Difference from Reference Image]

The smoke feature value calculating means 31 determines a luminance difference value between each pixel in each region and a corresponding pixel in a reference image previously stored in the image memory 10 for each region. Further, the smoke feature value calculating means 31 determines an average value of the luminance difference values for each region. This way, the smoke feature value calculating means 31 outputs the average value of the luminance difference values as the feature value regarding smoke.

Subsequently, the smoke judging means 33 to be described below may judge that a probability of smoke occurrence is high when the average value calculated by the smoke feature value calculating means 31 is higher than a predetermined value.

Next, the region-to-region sensitivity setting means 40 is described. The region-to-region sensitivity setting means 40 is means for setting a desired detection sensitivity for each of the plurality of previously divided regions. With this region-to-region sensitivity setting means 40, an operator or the like may manually set a desired detection sensitivity for a particular region in advance. It is not always necessary to perform smoke detection at the same detection sensitivity on all regions of the image captured to be monitored. For example, by setting the detection sensitivity to higher for regions having a factor that is likely to cause smoke and setting the detection sensitivity to lower for regions having many factors in false alarm or having a low probability of smoke occurrence depending on an object to be monitored, there may be realized appropriate smoke detection while avoiding false detection and detection failure.

Therefore, the region-to-region sensitivity setting means 40 may select and set a desired detection sensitivity from among three levels of high, medium, and low, for example, as the detection sensitivity for each region in advance depending on the object to be monitored.

FIGS. 9A and 9B are exemplary diagrams of desired detection sensitivities set for respective regions of the image to be monitored according to the second embodiment of the present invention. FIG. 9A illustrates a case where detection sensitivities of all 20 divided regions are set to the "medium level". On the other hand, FIG. 9B illustrates a case where regions are separated and set to different detection sensitivities of the "high level", "medium level", and "low level". By thus setting a desired detection sensitivity for each region depending on the image to be monitored, there may be realized appropriate smoke detection while avoiding false detection and detection failure. In setting the sensitivities, upper regions of the image may be set to the high sensitivity considering the fact that smoke flows upward, and lower regions of the image where a person is expected to move about may be set to the low sensitivity. Further, regions around illumination where luminance changes to become a factor in generating disturbance may be set to the low sensitivity.

Then, the smoke judging means 33 retrieves a reference judgment value corresponding to the desired detection sensitivity set by the region-to-region sensitivity setting means 40 from among reference judgment values corresponding to the detection sensitivities including the three levels of high, medium, and low stored in the storage portion 15 for each of the plurality of regions. Further, the smoke judging means 33 compares the feature value extracted by the smoke feature value calculating means 31 and the retrieved reference judgment value to judge whether or not the probability of smoke occurrence is high based on a result of the comparison. Note that when the reference value serving as a threshold is set as a predetermined range, the predetermined range corresponding to the high level is set narrower than the predetermined range corresponding to the medium level, and the predetermined range corresponding to the medium level is set narrower than the predetermined range corresponding to the low level.

This way, the smoke judging means 33 may detect smoke occurrence at the desired detection sensitivity in each of the plurality of regions.

Specifically, in the cases of the extraction methods 1 to 4 of the smoke feature value calculating means 31, the following reference judgment values are previously stored in the storage portion 15. When the feature value regarding smoke is extracted using the extraction method 1, reference judgment values corresponding to detection sensitivities including three levels of high, medium, and low are stored in the storage portion 15 as reference judgment values of the luminance distribution or the standard deviation obtained from the luminance distribution.

Alternatively, when the feature value regarding smoke is extracted using the extraction method 2, reference judgment values corresponding to detection sensitivities including three levels of high, medium, and low are stored in the storage portion 15 as reference judgment values of the luminance distribution calculated based on the time-series data of the average luminance values or the standard deviation obtained from the luminance distribution.

Alternatively, when the feature value regarding smoke is extracted using the extraction method 3, reference judgment values corresponding to detection sensitivities including three levels of high, medium, and low are stored in the storage portion 15 as reference judgment values of the intensity of the low-frequency components calculated based on the time-series data of the average luminance values.

Alternatively, when the feature value regarding smoke is extracted using the extraction method 4, reference judgment values corresponding to detection sensitivities including three levels of high, medium, and low are stored in the storage portion 15 as reference judgment values of the average value of the luminance difference values.

As described above, the smoke detecting apparatus according to the second embodiment of the present invention may divide the region to be monitored into a plurality of regions in matrix and set a detection sensitivity for each sub-region considering the probability of presence or absence of smoke occurrence. Therefore, the smoke detection may be performed using a reference judgment value having a desired detection sensitivity for each region depending on the object to be monitored. Consequently, there may be realized the smoke detecting apparatus which avoids false detection due to the effect of disturbance without limiting the range that may be monitored.

Note that there is no necessity to select only one of the extraction methods 1 to 4 described as examples of the specific method of extracting the feature value regarding smoke for use. The smoke judging means 33 may also finally judge the presence or absence of smoke occurrence based on judgment results of a plurality of the extraction methods. In this case, the reference judgment values corresponding to the plurality of sensitivity levels are stored for the plurality of extraction methods in the storage portion 15.

Third Embodiment

As described above, the second embodiment describes the case where a desired detection sensitivity is manually set (that is, statically set) for each region in advance depending on the object to be monitored. In contrast, a third embodiment of the present invention describes a case where presence or absence of an effect of disturbance such as a moving object and an illumination change is judged based on an analysis result of a current captured image, and the detection sensitivity is set dynamically.

Figure 10:
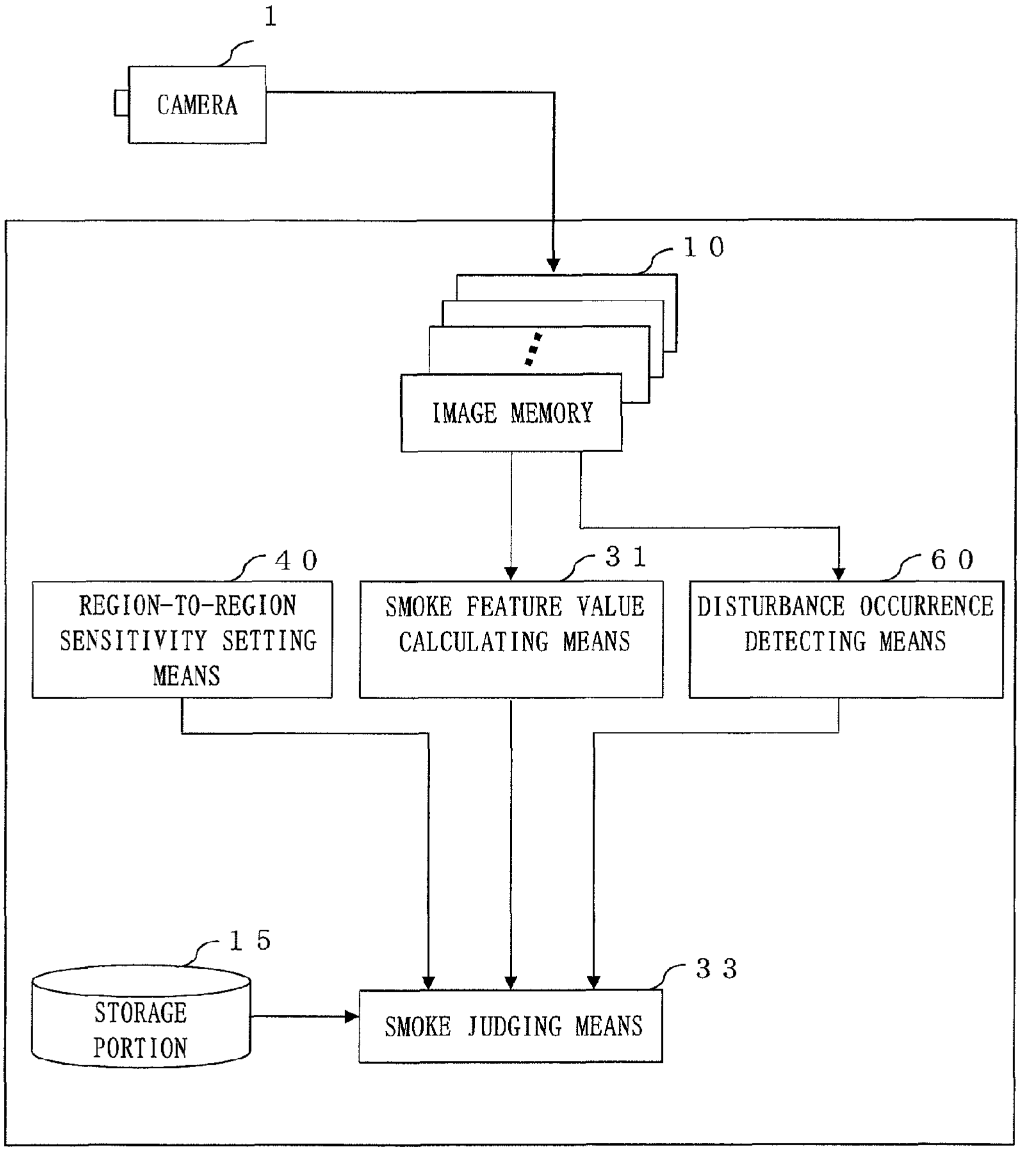
FIG. 10 is a configuration diagram illustrating a smoke detecting apparatus according to a third embodiment of the present invention.

FIG. 10 is a configuration diagram illustrating a smoke detecting apparatus according to the third embodiment of the present invention. Compared to the configuration of FIG. 7 illustrating the smoke detecting apparatus of the second embodiment described above, the configuration of FIG. 10 illustrating the smoke detecting apparatus of the third embodiment of the present invention is different in that disturbance occurrence detecting means 60 is newly added. Therefore, a function of the disturbance occurrence detecting means 60 is mainly described below.

The image memory 10 is configured as an image memory for a plurality of frames so that images captured by a camera 1 may be stored over a past predetermined period as time-series data. The disturbance occurrence detecting means 60 calculates a feature value based on a temporal change in luminance in each of a plurality of previously divided regions using the time-series data stored in the image memory 10. The feature value is an index for judging (discriminating) whether or not the effect of disturbance due to the moving object or illumination change has occurred, and specific examples thereof are described later.

Further, the disturbance occurrence detecting means 60 judges whether or not the effect of disturbance has occurred based on a result of comparison between the calculated feature value and a predetermined reference value, and notifies the smoke judging means 33 of a result of the judgment.

On the other hand, when the smoke judging means 33 retrieves one reference judgment value from among a plurality of predetermined reference judgment values stored in the storage portion 15, the smoke judging means 33 retrieves a reference judgment value having a detection sensitivity lower than the desired detection sensitivity set by the region-to-region sensitivity setting means 40 for a region in which the effect of disturbance is judged to have occurred by the disturbance occurrence detecting means 60. As a result, the smoke judging means 33 detects smoke occurrence at the detection sensitivity lower than the desired detection sensitivity in the region in which the effect of disturbance is judged to have occurred.

Assume a case where, for example, a region for which the desired detection sensitivity is set to the medium level by the region-to-region sensitivity setting means 40 is judged as a region in which the effect of disturbance has occurred by the disturbance occurrence detecting means 60. In this case, the smoke judging means 33 retrieves, in stead of a reference judgment value corresponding to the desired medium level, a reference judgment value corresponding to the low level, which is one rank lower than the medium level, from the storage portion 15, for detecting smoke occurrence in the region. Then, the smoke judging means 33 makes smoke judgment based on a comparison with the feature value extracted by the smoke feature value calculating means 31.

Assume another case where, for example, a region for which the desired detection sensitivity is set to the high level by the region-to-region sensitivity setting means 40 is judged as a region in which the effect of disturbance has occurred by the disturbance occurrence detecting means 60. In this case, the smoke judging means 33 retrieves, in stead of a reference judgment value corresponding to the desired high level, the reference judgment value corresponding to the medium level, which is one rank lower than the high level, or the reference judgment value corresponding to the low level, which is two ranks lower than the high level, from the storage portion 15, for detecting smoke occurrence in the region. Then, the smoke judging means 33 makes smoke judgment based on a comparison with the feature value extracted by the smoke feature value calculating means 31.

Whether to lower the reference judgment value by one rank from the high level to the medium level or by two ranks from the high level to the low level may be defined as follows. Firstly, it is possible to define in advance a rule that the reference judgment value is lowered by only one rank from the desired detection level when it is judged that the effect of disturbance has occurred in the region by the disturbance occurrence detecting means 60, or that the reference judgment value is always lowered to the low level.

Secondly, it is possible to retain two reference judgment values used by the disturbance occurrence detecting means 60 for the comparison and define whether to lower the reference judgment value by one rank or two ranks based on a result of the comparison. In addition, the reference judgment value may always be lowered to the low sensitivity when it is judged that the disturbance has occurred also in adjacent regions. For example, of eight adjacent regions surrounding the region to be monitored, the sensitivity of the target region may be set to the low sensitivity depending on the number of the surrounding regions in which the disturbance has occurred.

Next, specific examples of the feature value, which is an index for judging whether or not the effect of disturbance has occurred, is described. Described in detail below as two factors of the disturbance are (1) a case where luminance has changed due to an illumination change, and (2) a case where luminance has changed due to a moving object such as a passerby. In any case, it is important to discriminate the disturbance from a change in luminance due to smoke occurrence.

(1) Case where Luminance has Changed Due to Illumination Change

Figure 11:
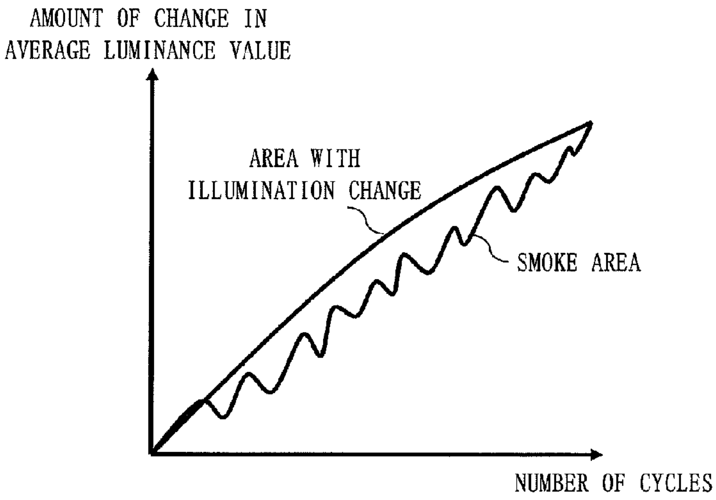
FIG. 11 is a graph illustrating transitions of amounts of change in luminance according to the third embodiment of the present invention.

The change in luminance due to the illumination change and the change in luminance due to smoke both have a slow and gradual change in common. Therefore, it is difficult to distinguish them based on an amount of change in luminance. However, it is possible to distinguish them when attention is focused on a transition of the change in luminance. FIG. 11 is a graph illustrating transitions of amounts of change in average luminance according to the third embodiment of the present invention, where the ordinate represents the amount of change in average luminance value, and the abscissa represents the number of cycles.

As illustrated in FIG. 11, the change in luminance due to the illumination change has a tendency to change continuously (that is, increase or decrease monotonously) as a whole while being affected by the illumination. In contrast, the change in luminance due to the effect of smoke has a tendency to change with oscillation and the amount of change in average luminance does not show a constant change due to the characteristic of smoke itself.

Therefore, the disturbance occurrence detecting means 60 calculates an average luminance value for each region with respect to time-series data of the images to be monitored, counts +1 when a change occurs to increase the average luminance value, and counts −1 when a change occurs to decrease the average luminance value. The disturbance occurrence detecting means 60 counts the change in average luminance in cycles shorter than the oscillation of the amount of change in average luminance due to the effect of smoke.

When counted as above, the count monotonously increases (or monotonously decreases) and reaches a predetermined count after a certain period of time in the case where the average luminance changes with the illumination change. In contrast, the count increases and decreases repeatedly and does not reach the predetermined count even after the certain period of time in the case where the average luminance changes due to the effect of smoke.

Therefore, the disturbance occurrence detecting means 60 may clearly discriminate the change in luminance due to the illumination change by counting the change in average luminance value for each divided region with respect to the time-series data of the images to be monitored. When the disturbance occurrence detecting means 60 judges that the change in luminance has occurred due to the illumination change, the disturbance occurrence detecting means 60 outputs to the smoke judging means 33 a notification that the effect of disturbance has occurred.

When the change in luminance due to the illumination change is detected by the disturbance occurrence detecting means 60, the smoke judging means 33 performs smoke detection with a lowered reference judgment value. As a result, the smoke judging means 33 may detect smoke occurrence at a detection sensitivity lower than the desired detection sensitivity in the region in which the effect of disturbance (change in luminance due to illumination change) is judged to have occurred. Therefore, the smoke judging means 33 may avoid false detection, which would occur when the detection sensitivity is not changed for the region, or detection failure, which would occur by masking the region.

(2) Case where Luminance has Changed Due to Moving Object Such as Passerby

In order to distinguish the change in luminance due to a moving object such as a passerby from the change in illumination due to smoke, attention is focused on a correlated value between images adjacent in time. In a region in which the luminance is gradually blurred due to smoke occurrence, the correlated value tends to decrease or increase gradually due to the characteristic of smoke itself. On the other hand, in a region in which a normal background is occluded by the moving object such as the passerby, the correlated value tends to change abruptly.

Therefore, the disturbance occurrence detecting means 60 calculates an average luminance for each region in images of a preceding cycle and a current cycle to calculate a correlated value for the same region. Then, the disturbance occurrence detecting means 60 sequentially determines the correlated value with respect to time-series data of the images to be monitored, and judges whether or not an amount of change in the correlated value is equal to or higher than a predetermined value, to thereby clearly discriminate the change in luminance due to the moving object such as the passerby. When the disturbance occurrence detecting means 60 judges that the change in luminance due to the moving object such as the passerby has occurred, the disturbance occurrence detecting means 60 outputs to the smoke judging means 33 a notification that the effect of disturbance has occurred.

On the other hand, when the disturbance occurrence detecting means 60 detects the change in luminance due to the moving object such as the passerby, the smoke judging means 33 performs smoke detection with a lowered reference judgment value. As a result, the smoke judging means 33 may detect smoke occurrence at a detection sensitivity lower than the desired detection sensitivity in the region in which the effect of disturbance (change in luminance due to moving object such as passerby) is judged to have occurred. Therefore, the smoke judging means 33 may avoid false detection, which would occur when the detection sensitivity is not changed for the region, or detection failure, which would occur by masking the region.

Note that the regions for which the feature value is determined by the disturbance occurrence detecting means 60 are not necessarily the same as the plurality of regions previously divided as the regions to be subjected to smoke detection, and may be set separately.

As described above, the smoke detecting apparatus according to the third embodiment of the present invention may perform smoke detection using the reference judgment value having the desired detection sensitivity for each region depending on the object to be monitored. Further, the smoke detecting apparatus according to the third embodiment of the present invention determines the feature value indicating that the effect of disturbance has occurred based on the time-series data of the images to be monitored, and may dynamically change the detection sensitivity when it is judged that the effect of disturbance has occurred. Consequently, there may be realized the smoke detecting apparatus which avoids false detection due to the effect of disturbance without limiting the range that may be monitored. Note that when the disturbance occurrence detecting means judges that the effect of disturbance has occurred in a very small region, the sensitivity may be switched from medium to high.

The smoke detecting apparatus according to the third embodiment of the present invention is especially useful when there is an effect of not steady disturbance but disturbance that changes with time, as in the case of the change in luminance due to the illumination change or the case of the change in luminance due to the moving object such as the passerby.

There has been described the case where the detection sensitivity is lowered when it is judged that the effect of disturbance has occurred. On the contrary, when it is judged that there is no more effect of disturbance after the detection sensitivity is once lowered, the detection sensitivity may be reset to thereby recover the desired detection sensitivity. Further, the sensitivity settings have been described in the embodiments as three levels of high, medium, and low, but the number of sensitivity levels may be set to be switched between two levels or among four or more levels, for example. Alternatively, the number of levels of sensitivity setting may be determined in each case depending on the way of calculating the smoke feature value.

What is claimed is:

1. A smoke detecting apparatus for detecting occurrence of smoke by subjecting an image captured by a monitoring camera to image processing, the smoke detecting apparatus comprising:

an image memory for storing a plurality of images captured by the monitoring camera in a time series; and a smoke detection area selecting portion for calculating a luminance histogram of the same pixel for each predetermined pixel a plurality of times in a past predetermined period based on the plurality of images stored in the image memory, detecting presence or absence of a luminance value that has been newly generated due to occurrence of one of an intrusive object and smoke based on the luminance histogram, and identifying candidate regions to be subjected to the image processing.

2. The smoke detecting apparatus according to claim 1, wherein the smoke detection area selecting portion comprises:

luminance histogram creating means for calculating the luminance histogram;

luminance change judging means for detecting the presence or absence of the luminance value that has been newly generated due to the occurrence of the one of the intrusive object and smoke based on the luminance histogram that has been individually calculated for the each predetermined pixel by the luminance histogram creating means, and mapping pixels having the newly generated luminance value; and detection candidate region identifying means for determining a ratio of the pixels which have been mapped by the luminance change judging means to have the newly generated luminance value, for each predetermined area including a plurality of pixels, and identifying regions having the ratio equal to or higher than a predetermined value as the candidate regions to be subjected to the image processing.

3. The smoke detecting apparatus according to claim 1, further comprising a smoke occurrence detecting portion for calculating a feature value regarding smoke for each of the regions identified as the candidate regions in the image captured by the monitoring camera, and judging presence or absence of smoke occurrence based on a result of the calculation.

4. The smoke detecting apparatus according to claim 3, wherein the smoke occurrence detecting portion comprises:

smoke feature value calculating means for extracting the feature value regarding smoke for each of the candidate regions, and judging whether or not the each of the candidate regions has a high probability of smoke occurrence based on a result of the extraction;

mapping means for mapping regions judged by the smoke feature value calculating means to have the high probability of smoke occurrence; and smoke judging means for judging that smoke has occurred if the regions judged to have the high probability of smoke occurrence and mapped by the mapping means are detected across a predetermined number of regions over a predetermined continuous period of time.

5. The smoke detecting apparatus according to claim 4, wherein:

the smoke feature value calculating means extracts a plurality of feature values as the feature value to judge whether or not the each of the candidate regions has the high probability of smoke occurrence; and the mapping means maps regions judged to have the high probability of smoke occurrence in common with respect to a certain combination of respective judgment results based on the plurality of feature values.

6. A smoke detecting apparatus, comprising:

smoke feature value calculating means for extracting a feature value regarding smoke for each of a plurality of regions set in an image captured by a monitoring camera;

a storage portion storing a plurality of predetermined reference judgment values having a plurality of detection sensitivities for the each of the plurality of regions, for judging presence or absence of smoke occurrence for the each of the plurality of regions;

region-to-region sensitivity setting means for setting a desired detection sensitivity for the each of the plurality of regions depending on an object to be monitored by the monitoring camera; and smoke judging means for retrieving a predetermined reference judgment value corresponding to the desired detection sensitivity set by the region-to-region sensitivity setting means from among the plurality of predetermined reference judgment values stored in the storage portion, comparing the retrieved predetermined reference judgment value with the feature value extracted by the smoke feature value calculating means, and detecting smoke occurrence at the desired detection sensitivity for the each of the plurality of regions based on a result of the comparison, for the each of the plurality of regions.

7. The smoke detecting apparatus according to claim 6, further comprising disturbance occurrence detecting means for calculating a feature value for discriminating whether or not a temporal change in luminance in the each of the plurality of regions is due to an effect of disturbance other than the smoke occurrence based on time-series data of a plurality of the images captured by the monitoring camera in a time series, and judging whether or not the effect of disturbance has occurred based on a result of comparing the feature value and a predetermined reference value, wherein, in retrieving one reference judgment value from among the plurality of predetermined reference judgment values stored in the storage portion, the smoke judging means retrieves a reference judgment value having a detection sensitivity lower than the desired detection sensitivity set by the region-to-region sensitivity setting means to detect the smoke occurrence at the detection sensitivity lower than the desired detection sensitivity in the region in which the effect of disturbance is judged to have occurred by the disturbance occurrence detecting means.

8. The smoke detecting apparatus according to claim 7, wherein the disturbance occurrence detecting means calculates an amount of change in average luminance as the feature value for the each of the plurality of regions based on the time-series data, and judges that an illumination change has occurred as the effect of disturbance when the amount of change in average luminance one of increases and decreases monotonously to a predetermined amount.

9. The smoke detecting apparatus according to claim 7, wherein the disturbance occurrence detecting means sequentially calculates a correlated luminance value between a preceding cycle and a current cycle as the feature value based on the time-series data, and judges that temporary occlusion by a moving object occurs as the effect of disturbance if an amount of change in the correlated luminance value is equal to or higher than a predetermined value.

* * * * *